United States Patent [19]
Nauman

[11] 4,072,063
[45] Feb. 7, 1978

[54] ENGINE CRANKING ADAPTER

[75] Inventor: Harold Joseph Nauman, Dunlap, Ill.

[73] Assignee: Caterpillar Tractor Co., Peoria, Ill.

[21] Appl. No.: 768,122

[22] Filed: Feb. 14, 1977

[51] Int. Cl.$^2$ .................... F16H 1/06

[52] U.S. Cl. .................... 74/405; 74/414; 74/432; 74/625

[58] Field of Search .................... 74/405, 432, 414, 625

[56] References Cited

U.S. PATENT DOCUMENTS

| | | | |
|---|---|---|---|
| 2,724,289 | 11/1955 | Wight | 74/625 |
| 3,395,588 | 8/1968 | Bleigh et al. | 74/405 |

*Primary Examiner*—Allan D. Herrmann

*Attorney, Agent, or Firm*—Wegner, Stellman, McCord, Wiles & Wood

[57] ABSTRACT

An engine cranking adapter having a plurality of different pinions for selective use with any one of a plurality of different engine cranking ring gears. The adapter is mounted to a wall portion of the engine structure adjacent the periphery of the ring gear and may substitute in such mounting for the normal starter motor. The adapter is provided with structure for facilitating manual controlled rotation of the ring gear as in servicing the associated engine. The adapter may be removably mounted to a bracket which, in turn, may be removably mounted to an engine wall portion adjacent the periphery of the ring gear.

10 Claims, 3 Drawing Figures

ENGINE CRANKING ADAPTER

BACKGROUND OF THE INVENTION

1. Field of the Invnention

This invention relates to engine structures and in particular to means for effecting manual cranking thereof.

2. Description of the Prior Art

In U.S. Pat. No. 3,395,588 of Harold R. Bleigh et al, which patent is owned by the assignee hereof, a flywheel rotation device is provided having a pinion movable into engagement with a ring gear portion of the engine. The pinion is adapted for manual rotation for adjusting the position of the ring gear and associated flywheel as for use in effecting timing of the engine.

As brought out in said Bleigh et al patent, it is desirable at times to effect rotation of the engine flywheel manually during the servicing of the engine. The Bleigh et al flywheel rotation device eliminates the disadvantages of the commonly used pry bar for effecting such adjustment of the flywheel and permits rotation of the flywheel against the substantial resistance of the compression pressures and weight of the engine. More specifially, the Bleigh et al rotation device comprises a pinion mounted for selective movement between an inoperative position of disengagement with the flywheel ring gear and an inoperative position of disengagement relative to the gear. Such selective positioning was controlled by a removable spacer permitting axial adjustment of the pinion in a mounting hole portion of the engine wall.

SUMMARY OF THE INVENTION

The present invention comprehends an improved means for effecting selective manual adjustment of the engine flywheel as in the servicing of the engine which is adapted for substitution for the conventional starter motor and which is further adapted for use with different size ring gears.

More specifically, the invention comprehends an improved cranking adapter having first and second pinions at the opposite ends thereof for meshing with ring gears having corresponding first and second different configurations.

The cranking adapter may be removably carried by a bracket which, in turn, may be movably secured to the wall of the engine normally carrying the starter motor.

The cranking adapter may be provided with stop means for limiting the movement thereof toward the ring gear and in the illustrated embodiment, the stop means comprises an annular shoulder at the inner end of each of the end pinions.

The midportion of the adapter may comprise a cylindrical mounting portion to be freely rotatable in a complementary bore of the mounting bracket.

The mounting bracket may include a cylindrical portion received in the hole in the engine wall through which the starter motor shaft is adapted to project in driving the ring gear.

The bracket may be mounted to the engine wall by means of a plurality of bolts which may comprise the bolts provided for normally securing the starter motor to the engine wall.

The adapter may comprise a stub shaft with sockets opening axially outwardly at each end thereof for receiving a common cranking lever connector portion for effecting rotation of the adapter about the axis thereof and concurrent adjustment of the meshed ring gear. Thus, the present invention cmprehends an improved reversible cranking adapter providing facilitated manual adjustment of the engine flywheel as during servicing of the engine. The cranking adapter and mounting bracket are extremely simple and economical of construction while yet providing a highly improved facility in the servicing of engines and the like.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
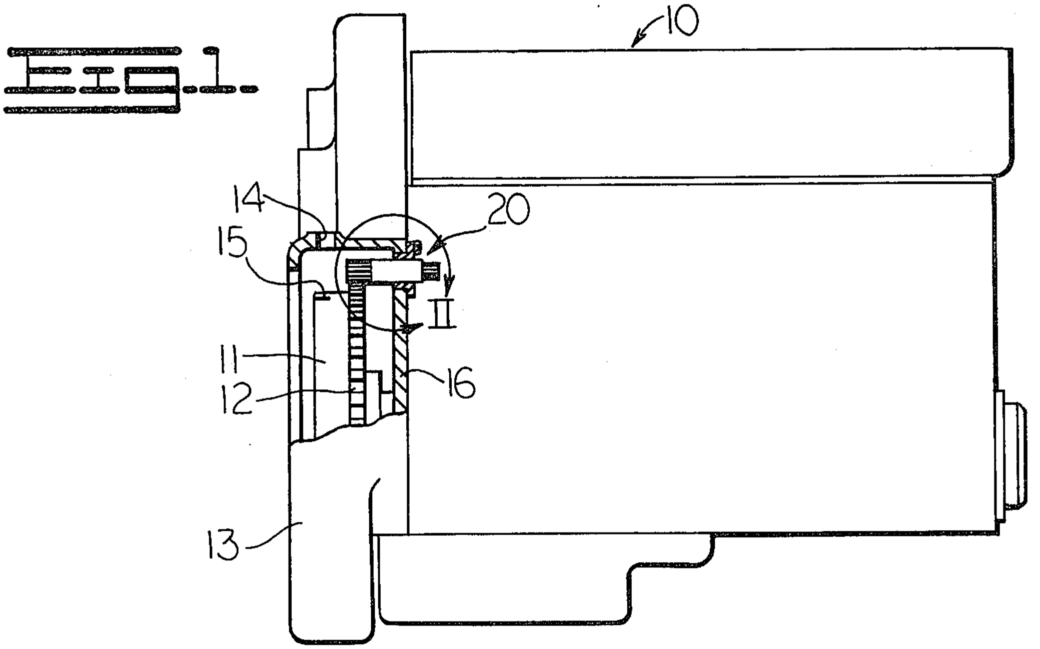
FIG. 1 is a side view of an engine structure with a portion broken away to illustrate a cranking adapter embodying the invention installed therein for use in servicing the engine.

In the exemplary embodiment of the invention as disclosed in the drawing, an engine structure generally designated 10 is shown to comprise a generally conventional internal combustion engine having a flywheel 11 and an associated ring gear 12. The flywheel and ring gear ring gear are mounted for rotation in a housing 13 having a timing opening 14 adapted for observation of a timing mark 15 providing on the flywheel 11 to indicate the top dead center of the #1 piston of the engine for providing accurate timing of the ignition or fuel injection system thereof.

Housing 13 may be mounted on a wall portion 16 of the engine having an opening 17 therein aligned with the tooth portion 18 of the ring gear. Wall portion 16 is adapted to mount a conventional starter motor (not shown) in driving association with the ring gear 12. To this end, the starter motor may be mounted to the wall portion 16 by suitable removable bolts 19, permitting the drive motor shaft to extend through the hole 17 and the pinion on the end of the drive motor shaft to have meshing driving engagement with the teeth 18 of the ring gear 12. Such structure is conventional and is well known to those skilled in the art and requires no further illustration or disclosure herein.

Figure 2:
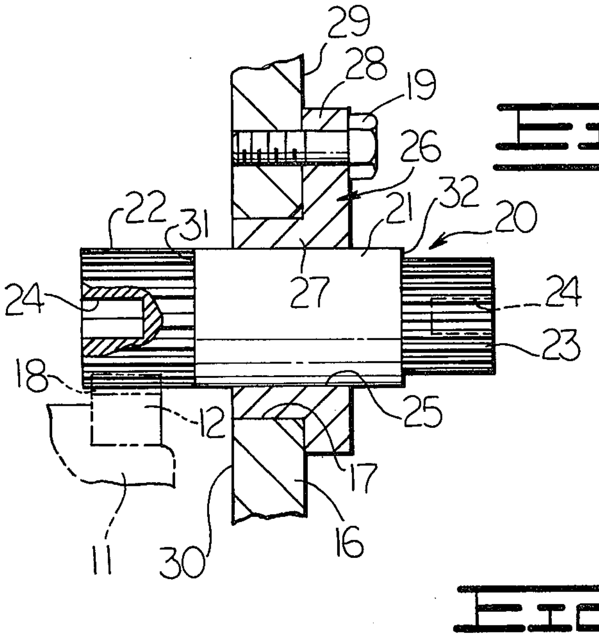
FIG. 2 is a fragmentary enlarged side elevation illustrating in greater detail the arrangement of the cranking adapter in the engine structure.

As indicated briefly above, the present invention comprehends an improved means to effecting manual adjustment of the engine as during servicing thereof. More specifically, as shown in FIG. 2, the invention comprehends the provision of a cranking adapter generally designated 20 for use in such rotational adjustment of the engine. As shown in FIG. 2, the cranking adapter comprises a stub shaft having a cylindrical midportion 21, a first end 22 defining a first pinion having a first preselected tooth configuration, and an opposite second end 23 defining a second pinion having a second, different preselected configuration. As shown in FIG. 2, pinion 22 is adapted for use with the ring gear 12 having teeth 18 defining a first preselected configuration, i.e. tooth profile and pitch diameter.

Figure 3:
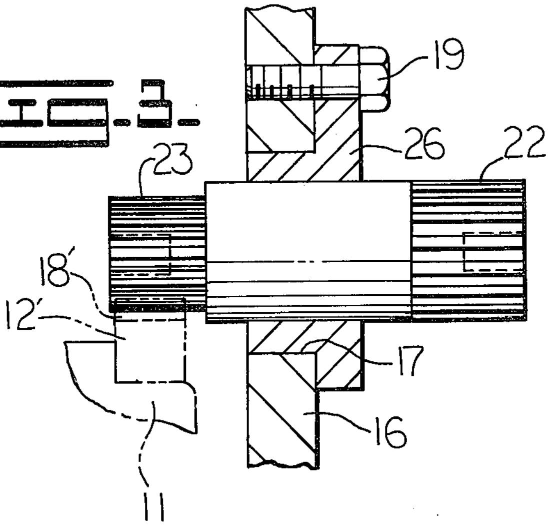
FIG. 3 is a fragmentary elevation similar to that of FIG. 2 but with the cranking adapter in a reversed arrangement for use with a different size flywheel ring gear.

As shown in FIG. 3, pinion 23 is adapted for meshed engagement with a different ring gear 12' having a different comfiguration of teeth 18'. As shown, the ring gear 12' may have a somewhat larger diameter than that of ring gear 12. As is well known to those skilled in the art, the majority of presently conventional ring gears are provided with one of two different size tooth profile and pitch diameter configurations so that the present adapter is adapted for use with a substantial number of different conventional ring gears in present commercial use.

As shown in FIG. 2, the pinions 22 and 23 are coaxial of cylindrical midportion 21 and each is provided with an outwardly opening socket 24 for receiving a suitable cranking lever, not shown.

The cranking adapter is mounted for free rotation in a cylindrical bore 25 of a mounting bracket 26. The mounting bracket includes an annular portion 27 received in the engine wall hole 17, and an outturned flange 28 secured to the outer surface 29 of wall 16 by bolts 19.

The inner surface 30 confronts the interior of housing 13 adjacent the peripheral tooth portion 18 of the ring gear. Pinion ends 22 or 23 may selectively be inserted through the bracket bore 25 into meshed engagement with the complementary ring gear tooth portion.

Axial inward movement of the adapter is limited by engagement of an annular shoulder 31 at the juncture between adapter midportion 21 and pinion 22, or an annular shoulder 32 at the juncture between midportion 21 and pinion 23. Thus, the adapter 20 is removable rotatably mounted in the mounting bracket 26 and the mounting bracket 26 is removably secured to the engine wall portion 16 for facilitated utilization of the improved manual ring gear adjusting means.

The sockets 24 may be adapted for use with conventional socket wrench tools. Where the starter motor is mounted so as to avoid the need for extension thereof through the wall opening 17, a suitable plug may be provided (not shown) for closing the opening as desired.

In the use of the cranking adapter, the user merely selects the proper pinion portion and inserts the adapter through the bracket opening 25 to engage the selected pinion with the complementary tooth portion of the ring gear. As indicated above, such insertion is limited by the abutment of the annular stop shoulder defined by the end of midportion 21, with the side of the ring gear tooth portion.

The ring gear may then be rotationally adjusted by suitably manipulating a socket wrench in the opposite end socket 24 of the adapter while the user observes the flywheel periphery through the observation port 14 until the timing mark 15 is properly positioned to indicate the desired timed position of the engine.

Upon completion of the timing operation, the adapter may be axially withdrawn from the bracket opening 25 and/or the bracket removed from the housing wall 16 to permit reinstallation of the starter motor for conventional normal operation of the engine as desired.

The foregoing disclosure of specific embodiments is illustrative of the broad inventive concepts comprehended by the invention.

The embodiments of the invention in which an exclusive property or privilege is claimed are defined as follows:

1. In an engine structure having a flywheel, a ring gear mounted for rotation with the flywheel, a wall adjacent the ring gear, and starter motor mounting means on said wall for mounting of a starter motor thereon to have driving engagement with the teeth of the ring gear, the improvement comprising:

a cranking adapter having a midportion, a first pinion at one end, and a second pinion at the opposite end, said first pinion being adapted to mesh with ring gears having a first preselected configuration and said second pinion being adapted to mesh with ring gears having a second, different preselected configuration;

adapter mounting means for readily removably, rotatably mounting said midportion of the adapter to said wall with a selected one of said pinions meshing with said ring gear; and means for transmitting a rotational force to said pinion for rotating the flywheel through the selected meshed pinion.

2. The engine structure of claim 1 wherein said adapter mounting means includes a portion of said starter motor mounting means.

3. The engine structure of claim 1 wherein the starter motor mounting means includes a plurality of bolt holes in said wall and said adapter mounting means includes bolts adapted to be received selectively in said bolt holes.

4. The engine structure of claim 1 wherein said adapter midportion is cylindrical and said adapter mounting means comprises a bracket having a complementary cylindrical sleeve bearing portion rotatably mounting said adapter midportion.

5. The engine structure ov claim 1 wherein said wall defines a through hole adjacent a peripheral portion of the ring gear and defning an inner surface forming said peripheral portion and an opposite outer surface surrounding said hole, said adapter mounting means being selectively secured to said outer surface.

6. The engine structure of claim 1 wherein said wall defines a through hole adjacent a peripheral portion of the ring gear and defining an inner surface forming said peripheral portion and an opposite outer surface surrounding said hole, said adapter mounting means being selectively secured to said outer surface, said adapter mounting means including a bearing portion received in said hole for rotatably supporting said adapter midportion.

7. The engine structure of claim 1 wherein said force transmitting means comprises similar means on each of said adapter ends.

8. The engine structure of claim 1 wherein said midportion defines shoulder means at each of its opposite ends for engaging the ring gear to limit axial movement of the adapter toward the ring gear.

9. The engine structure of claim 1 wherein said force transmitting means comprises similar coaxial sockets in each of said adapter ends.

10. The engine structure of claim 1 wherein said adapter mounting means includes a mounting bracket and means for removable securing said mounting bracket to said wall, said adapter being removably carried by said mounting bracket for facilitated reversible disposition therein.

* * * * *

UNITED STATES PATENT AND TRADEMARK OFFICE

CERTIFICATE OF CORRECTION

PATENT NO. : 4,072,063

DATED : February 7, 1978

INVENTOR(S) : HAROLD JOSEPH NAUMAN

It is certified that error appears in the above-identified patent and that said Letters Patent are hereby corrected as shown below:

Column 2, line 3, after "invention" correct "cmprehends" to read --comprehends--;

line 35, after "gear" delete "ring gear".

Column 3, line 33, after "is" correct "removable" to read --removably--.

Column 4, line 37 (Claim 5, line 1) after "structure" cancel "ov" and substitute therefor --of--;

line 39 (Claim 5, line 3), after "and" correct "defning" to read --defining--, and after "surface" cancel "forming" and substitute therefor --facing--;

line 45 (Claim 6, line 3) after "surface" cancel "forming" and substitute therefor --facing--;

UNITED STATES PATENT AND TRADEMARK OFFICE

CERTIFICATE OF CORRECTION

PATENT NO. : 4,072,063

DATED : February 7, 1978

INVENTOR(S) : HAROLD JOSEPH NAUMAN

It is certified that error appears in the above-identified patent and that said Letters Patent are hereby corrected as shown below:

Column 4, line 64 (Claim 10, line 3) after "for" correct "removable" to read --removably--.

Signed and Sealed this

*Fourth* Day of *July 1978*

[SEAL]

*Attest:*

RUTH C. MASON
*Attesting Officer*

DONALD W. BANNER
*Commissioner of Patents and Trademarks*